(12) United States Patent
Gerke

(10) Patent No.: US 8,683,948 B2
(45) Date of Patent: Apr. 1, 2014

(54) TREE MOUNTABLE ANIMAL FEEDER

(76) Inventor: William P Gerke, Hallettsville, TX (US)

( * ) Notice: Subject to any disclaimer, the term of this patent is extended or adjusted under 35 U.S.C. 154(b) by 0 days.

(21) Appl. No.: 13/347,131

(22) Filed: Jan. 10, 2012

(65) Prior Publication Data

US 2013/0174787 A1      Jul. 11, 2013

(51) Int. Cl.
   *A01K 5/02*   (2006.01)
(52) U.S. Cl.
   USPC ..................................... 119/57.91; 119/57.1
(58) Field of Classification Search
   USPC ............. 119/57.91, 51.01, 51.11, 57.1, 57.92
   See application file for complete search history.

(56) References Cited

U.S. PATENT DOCUMENTS

| | | | | | |
|---|---|---|---|---|---|
| 3,703,939 | A | * | 11/1972 | Maxwell | 182/107 |
| 4,986,220 | A | * | 1/1991 | Reneau et al. | 119/57.91 |
| 5,143,289 | A | * | 9/1992 | Gresham et al. | 239/7 |
| 5,333,572 | A | * | 8/1994 | Nutt | 119/57.91 |
| 6,408,787 | B1 | * | 6/2002 | Clark | 119/51.01 |
| 6,698,549 | B2 | * | 3/2004 | Graham et al. | 182/136 |
| 7,191,732 | B2 | * | 3/2007 | Neal, Jr. | 119/57.91 |
| 2002/0108811 | A1 | * | 8/2002 | Ulmschneider et al. | 182/206 |
| 2005/0241588 | A1 | * | 11/2005 | Foster | 119/57.91 |
| 2011/0260127 | A1 | * | 10/2011 | Surgeon et al. | 254/362 |

* cited by examiner

*Primary Examiner* — Kimberly Berona
(74) *Attorney, Agent, or Firm* — Kenneth H Johnson

(57) ABSTRACT

An animal feeder for mounting to a tree includes a feed storage bin having a bottom opening positioned to deposit feed on to a dispersion disc positioned within a cowling to distribute feed through a directional opening in the cowling by rotating the disc with a timer controlled motor mounted below it and a gripper for mounting on a tree.

6 Claims, 3 Drawing Sheets

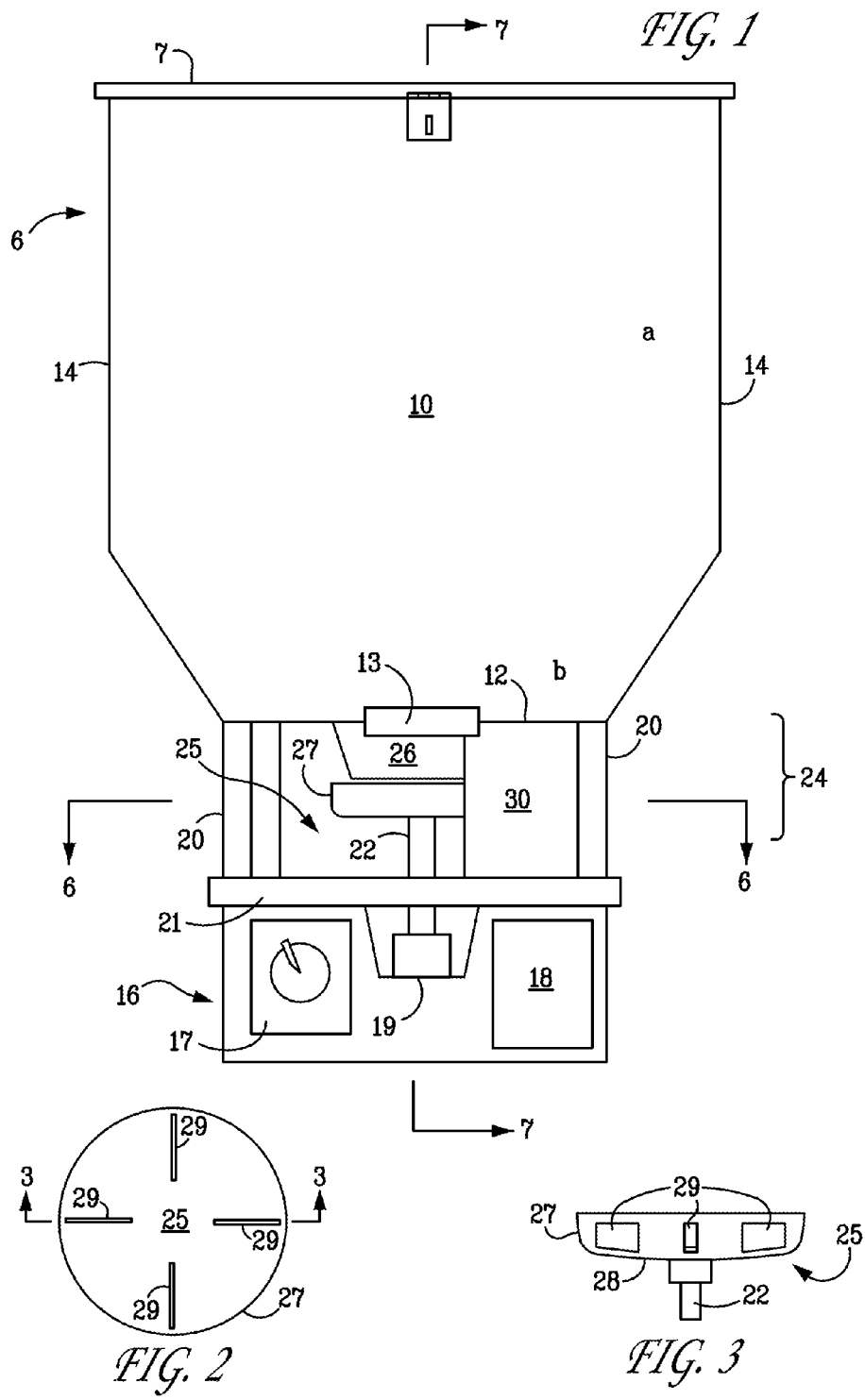

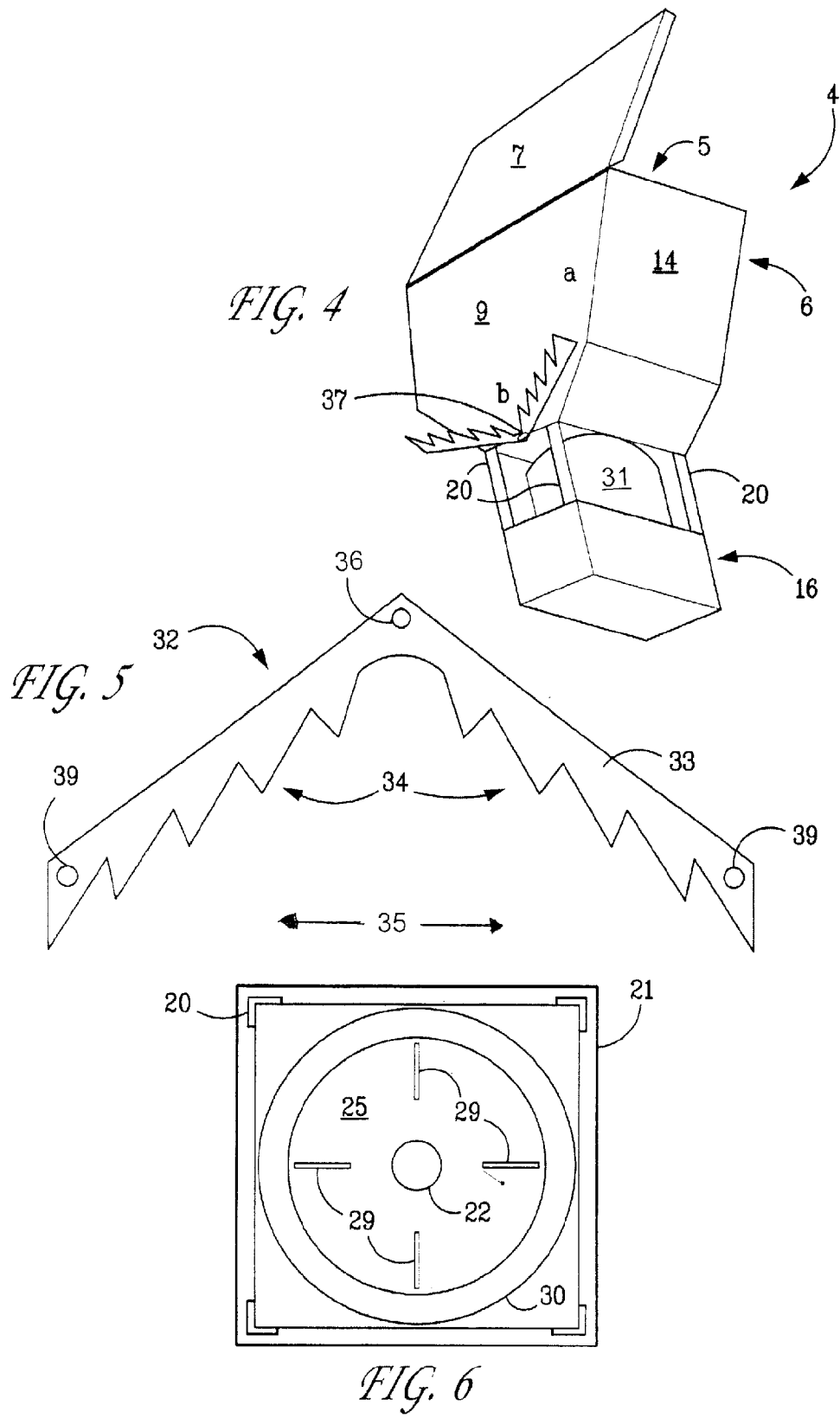

TREE MOUNTABLE ANIMAL FEEDER

BACKGROUND OF THE INVENTION

1. Field of the Invention

Various types of animal feeders are available and in use for storing and providing feed for animals in a feeding trough. The present invention provides a tree or pole mountable feeder of relatively simple construction for use in remote location which is sturdy, lightweight and mounting on a tree and having directional broadcasting of feed onto the ground.

2. Related Art

Most of the available animal feeder are large bulky devices made to distribute feed for multiple animals with large food storage, and although they are movable it is not intended that they are moved. It is the object of the present invention that the feeder is moved to where it needed for the purpose at hand. For that reason there are no legs or troughs and the feed is distributed on the ground or other surface and the feed it self mounted in noninjurious and removable manner to a tree.

SUMMARY OF THE INVENTION

The present invention provides an animal feeder which can be readily assembled on location. It may be constructed in various sizes depending upon the use to which it is to be put and is constructed so that it withstands contact with large animals during feeding so long it has a gripper for positioning on a tree. It includes a solar actuated power supply for assisting in discharging food from a food supply container to the feed distributor as necessary or desirable.

In one embodiment the present invention is an animal feeder comprising: a gripper comprising a bar having an angle of less than 90° to about 45° with a plurality of teeth extend from a small angle of the bar extending from a back side of said feeder, and a feed supply bin operably associated with a feed dispersing area positioned below said feed supply bin said feed dispersing area comprising: a motor operated dispersion wheel positioned below said opening in said dispersing area; a sleeve around said opening extending from said bottom into said dispersion area around said dispersion wheel, and a cowling in said dispersion area encasing said sleeve and said dispersion wheel and having a directional opening therein.

A preferred embodiment of the present invention is an animal feeder comprising:

a feed container having a front side, said front side having an upper end and a bottom end and an upper rectangular portion and a lower tapered portion and a corresponding parallel back side, said front side and said back side being space apart by and connected to a pair of side panels;

a bottom member having an opening therein connected to the lower ends of said front panel and back panel and corresponding lower ends on said side panels;

a slidable closure cooperatively engaged with said opening;

a feed dispersing area below said opening comprising a motor operated dispersion wheel positioned below said opening in said dispersing area;

a cowling extending from said bottom into said dispersion area around said dispersion wheel and having a opening over a portion thereof; and a gripper comprising a bar having an angle of less than 90° to about 45° with a plurality of teeth extend from a small angle of the bar extending from said back side.

BRIEF DESCRIPTION OF THE DRAWINGS

FIG. 1 is a front elevational view showing the animal feeder of the present invention assembled for use.

FIG. 2 is an in plan view of the feed dispersion wheel.

FIG. 3 is cross sectional view along 3-3 of FIG. 2.

FIG. 4 is a perspective rear view of feeder.

FIG. 5 is an in plan view of a tree gripper component.

FIG. 6 is an in plan detail view of the cowling and dispersion wheel along 6-6 of FIG. 1.

DESCRIPTION OF THE INVENTION AND PREFERRED EMBODIMENTS

Figure 7:
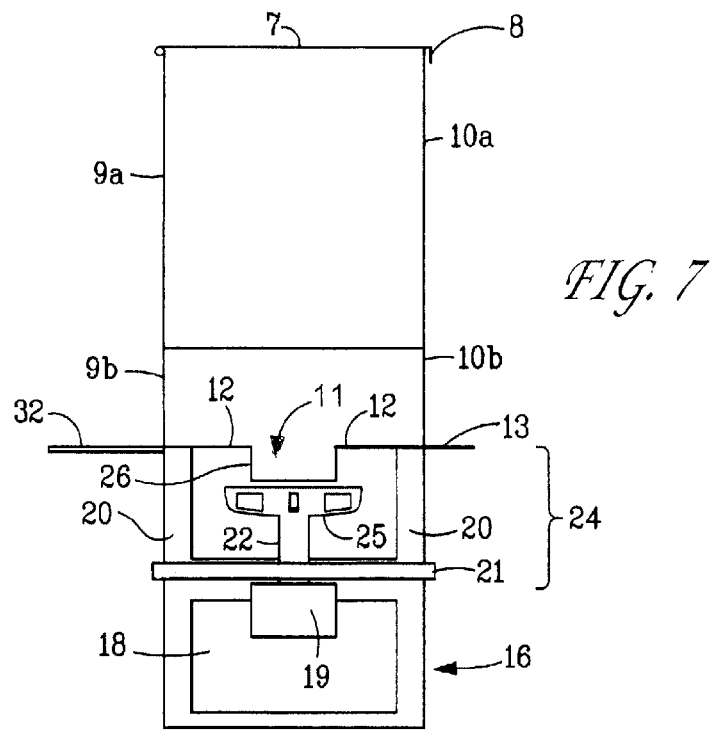
FIG. 7 is a cross sectional view along 7-7 of FIG. 1.

Referring to FIGS. 1, 4 and 7 of the drawings wherein a preferred form of feeder is represented generally by the numeral 6 It includes a feed supply, or storage container, or bin 14 with a cover 7 thereon. The cover 7 is hinged to the back side 9 along top edge 5 with a latch 8 engaging with the front side 10. The front side and back side are connected by a pair of side panels formed to match the configuration of the front and back sides along their adjacent edges. The front side and the back side are parallel mirror images which are comprised of a generally rectangular upper portion 10a and 9a respectively and a tapered lower portion 10b and 9b respectively to provide a funnel shape to the bin 14 and expedite movement of the feed (not shown) in the bin by gravity flow to an opening 11 (preferably round) in bottom 12. A slidable plate 13 through the front side 10b on the interior of bottom in cooperative engagement over the opening 11 to control the flow of feed from the bin 14.

Space below the bin 14 and attached by hangers 20 is a power and control box 16 which contains an electric timer 17, battery 18 and electric motor 19. The box 16 is equipped with a rotatable front cover 21 (show in open configuration). The motor has a shaft 22 extending through the top of the box 16 into the space 24 between the bin and the power and control box 16 and affixed to distribution disc 25 positioned below the opening 11. A sleeve 26 is attached around the opening 11 and extends into below the lip 27 of distribution disc 25.

Referring to FIGS. 2, 3 and 6 the distribution disc 25 is show in more detail of construction and placement. The distribution disc 25 is in the form of shallow cup having a concave shape with lip 27 extending toward the bin 14 and having a plurality (in this case 4) of paddles evenly space within the disc around the bottom portion 28 extend toward the bin 14 to a point below the lip 27 end and the sleeve 26 extension into the distribution disc 25. A cowling 30 from the top end (not shown) of box 16 to the bottom 12 of bin 14 partially around the distribution disc 25 with an opening 31 in the direction of the desired feed distribution, which in this case is from the front side 20 toward the ground (not shown).

FIG. 5 shows a gripper 32 attached to the feeder for mounting the feeder to a tree. The gripper comprises an angled bar 33 with a plurality of teeth 34 extend from the small angle 35 of the bar 33. The largest angle, is less than 90° to about 45°. A smaller angle restricts the use of the gripper with larger trees. A hole 36 is provide to attach the gripper to the feeder with a thumb screw to threaded seat 37 on the on the bottom 12 of the lower back side 9a. Holes 39 are provided to attach a strap or chain 41 and tighten for the teeth 34 to grip the tree without serious damage. Preferably the gripper is mounted at the lower end of side 9 of bin 14.

Figure 8:
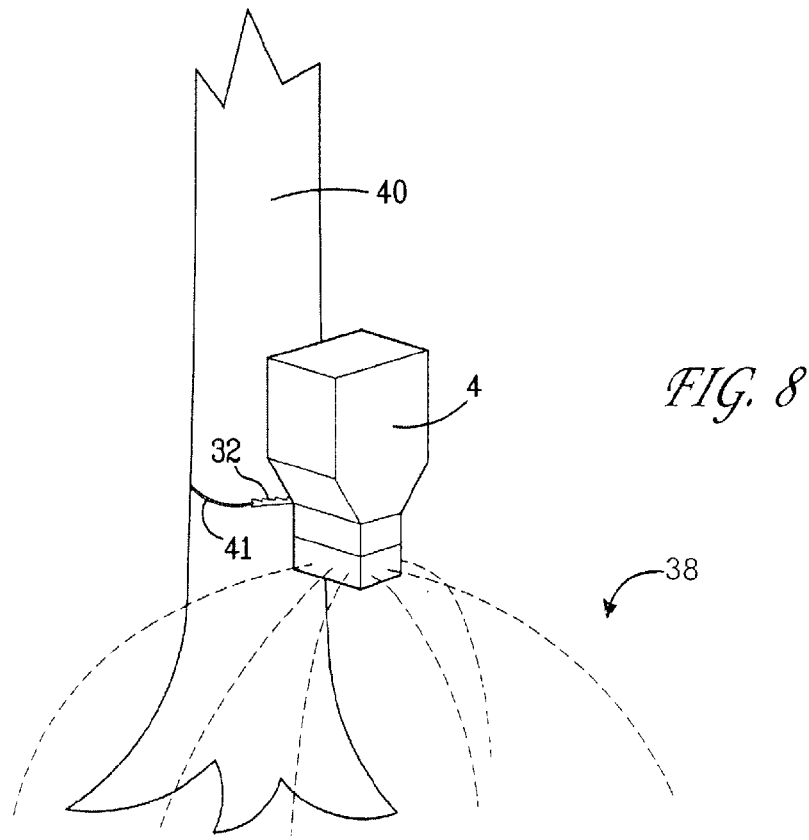
FIG. 8 is representation of the present feeder mounted on a tree in dispersing mode.

In operation present feeder 6 may be mounted on a tree 40 as shown in FIG. 8. The bin 14 contains feed such as corm or pellets (not shown). The slidable plate 13 is positioned on the bottom 12 over the opening 11 to be moved into (closed) and out (open) of the bin by hand by moving the plate 12 out of the bin and activating the timer. The electric motor 19 rotates in the present illustrations counterclockwise and is of sufficient strength at 12 volts and 7 amps to initiate rotation when the timer 17 activates it with feed material from the bin on the dispersion disc 53 and continue rating at from 3500 to 4500 rpms. Under these conditions some initial feed is dropped on the ground near the tree and as the disc reaches its operating speed the feed thrown from the dispersion disc with the aid of the paddles 29 and exit from the disc out of the directional opening 31 from the tree up to about 25 feet from the feeder in a generally fan dispersion pattern 38 for the period of time set on the timer and depending on supply feed in the bin.

The foregoing disclosure and description are illustrative and explanatory thereof, and various changes in size, shape and material as well as in the details of the illustrated construction may be made without departing from the spirit of the invention.

The invention claimed is:

1. A tree mountable animal feeder comprising:
   a gripper being the only support for said animal feeder on a tree above the ground, said gripper consisting of a bar having an angle of less than 90° to about 45° with a plurality of teeth extending from a small angle of the bar extending from said back side, said bar having a hole at each end thereof and a chain attachable at said holes, and
   a feed supply bin operably associated with a feed dispersing area positioned below said feed supply bin said feed dispersing area comprising:
      a motor operated dispersion wheel positioned below an opening in said dispersing area;
      a sleeve around said opening in said dispersing area extending from said bottom into said dispersion area and said dispersion wheel, and
      a cowling in said dispersion area encasing said sleeve and said dispersion wheel and having a directional opening therein.

2. A tree mountable animal feeder comprising:
   a feed container having a front side, said front side having an upper end and a bottom end and an upper rectangular portion and a lower tapered portion and a corresponding parallel back side, said front side and said back side being space apart by and connected to a pair of side panels;
   a bottom member having an opening therein connected to the lower ends of said front panel and back panel and corresponding lower ends on said side panels;
   a slidable closure cooperatively engaged with said opening;
   a feed dispersing area below said opening comprising a motor operated dispersion wheel positioned below said opening in said dispersing area;
   a sleeve around said opening extending from said bottom into said dispersion area and said dispersion wheel,
   a cowling in said dispersion area encasing said sleeve and said dispersion wheel and having a directional opening therein, and
   a gripper being the only support for said animal feeder on a tree above the ground, said gripper consisting of a bar having an angle of less than 90° to about 45° with a plurality of teeth extending from a small angle of the bar extending from said back side, said bar having a hole at each end thereof and a chain attachable at said holes.

3. The feeder according to claim 2 wherein said gripper is positioned at the lower end of said feed container.

4. The feeder according to claim 2 comprising a control and power module containing a battery operated timer, a battery and said electric motor is suspended below and space away from the bin to form said dispersion area.

5. The feeder according to claim 4 wherein a shaft from said motor into said dispersing area is supporting said dispersion wheel thereon.

6. The feeder according to claim 5 wherein said dispersion wheel comprises a concave disc having a lip extending toward bin and having a plurality of paddles space equidistant on said disc within the lip.

* * * * *